US010323605B2

(12) United States Patent
Miller et al.

(10) Patent No.: US 10,323,605 B2
(45) Date of Patent: Jun. 18, 2019

(54) METHOD AND SYSTEM FOR ENGINE WATER INJECTION

(71) Applicant: Ford Global Technologies, LLC, Dearborn, MI (US)

(72) Inventors: Kenneth James Miller, Canton, MI (US); Thomas G. Leone, Ypsilanti, MI (US); James Eric Anderson, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 251 days.

(21) Appl. No.: 15/258,914

(22) Filed: Sep. 7, 2016

(65) Prior Publication Data

US 2018/0066609 A1    Mar. 8, 2018

(51) Int. Cl.
*F02M 25/022*    (2006.01)
*F02B 47/02*    (2006.01)
*F02B 77/08*    (2006.01)
*F02M 25/03*    (2006.01)
*F02M 35/10*    (2006.01)

(52) U.S. Cl.
CPC ......... *F02M 25/0227* (2013.01); *F02B 47/02* (2013.01); *F02B 77/085* (2013.01); *F02M 25/0222* (2013.01); *F02M 25/03* (2013.01); *F02M 35/10386* (2013.01); *Y02T 10/121* (2013.01)

(58) Field of Classification Search
CPC ......... F02M 25/0227; F02M 35/10386; F02M 25/0222; F02M 25/022–25/038; F02M 25/025–25/03; F02B 77/085; F02B 47/00; F02B 47/02; Y02T 10/121; F02D 41/2451–41/2483; F02D 19/08–19/088; F02D 35/027; F02D 2200/0612; F02D 41/0025
USPC ......................................................... 123/25
See application file for complete search history.

(56) References Cited

U.S. PATENT DOCUMENTS

| 3,817,221 | A  | 6/1974 | Nohira et al. |
| 6,026,641 | A  | 2/2000 | Liberty |
| 6,553,753 | B1 | 4/2003 | Payling et al. |
| 6,581,375 | B2 | 6/2003 | Jagtoyen et al. |

(Continued)

FOREIGN PATENT DOCUMENTS

EP    2607647 A1    6/2013

OTHER PUBLICATIONS

Bohm, Martin, et al., "Approaches for On-board Water Provision for Water Injection," ATZ Worldwide 2016, vol. 118, pp. 54-57, 4 pages.

*Primary Examiner* — Joseph J Dallo
*Assistant Examiner* — Scott A Reinbold
(74) *Attorney, Agent, or Firm* — Julia Voutyras; McCoy Russell LLP

(57) ABSTRACT

Methods are provided for reliably self-testing a water injection system that injects water into the engine responsive to engine operating conditions such as knock, the water injection system refilled manually or via the collection of water on-board the vehicle. Responsive to a water injection error, learned based on a change in a defined set of engine parameters while ramping water injection during selected conditions, the presence of clogging in a water line may be determined. Based on a degree of clogging, subsequent water injection may be appropriately adjusted.

20 Claims, 4 Drawing Sheets

(56) References Cited

U.S. PATENT DOCUMENTS

| | | |
|---|---|---|
| 6,748,741 B2 | 6/2004 | Martin et al. |
| 7,000,409 B2 | 2/2006 | Mazzetti |
| 7,216,607 B2 | 5/2007 | Mezheritsky et al. |
| 9,291,125 B2 | 3/2016 | Yoshihara et al. |
| 2008/0167788 A1 | 7/2008 | Tate et al. |
| 2009/0084728 A1 | 4/2009 | Kirts |
| 2010/0121559 A1 | 5/2010 | Bromberg et al. |
| 2011/0048039 A1 | 3/2011 | Kohavi et al. |
| 2011/0099988 A1 | 5/2011 | Pellico |
| 2011/0174267 A1 | 7/2011 | Surnilla et al. |
| 2012/0178175 A1 | 7/2012 | Crosman |
| 2013/0218438 A1 | 8/2013 | Surnilla et al. |
| 2013/0291580 A1 | 11/2013 | Lindner |
| 2013/0333405 A1 | 12/2013 | Belady et al. |
| 2014/0058647 A1 | 2/2014 | Haladyna et al. |
| 2014/0102403 A1* | 4/2014 | Yoshihara ............ F02D 35/027 123/25 A |
| 2014/0190148 A1 | 7/2014 | Ruhland et al. |
| 2014/0366508 A1 | 12/2014 | Ulrey et al. |
| 2015/0020894 A1 | 1/2015 | Petzoldt |
| 2017/0114754 A1* | 4/2017 | Kluth ...................... F02D 41/22 |
| 2018/0128212 A1* | 5/2018 | Burak ................ F02M 25/0224 |

\* cited by examiner

METHOD AND SYSTEM FOR ENGINE WATER INJECTION

FIELD

The present description relates generally to methods and systems for controlling the quality of water injected into an engine.

BACKGROUND/SUMMARY

Internal combustion engines may include water injection systems that inject water into a plurality of locations, such as into an intake manifold, upstream of engine cylinders, or directly into engine cylinders. Engine water injection provides various benefits such as an increase in fuel economy and engine performance, as well as a decrease in engine emissions. In particular, when water is injected into the engine intake or cylinders, heat is transferred from the intake air and/or engine components to the water, leading to charge cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, improved wide-open throttle performance, and decreased exhaust temperature. As a result, fuel efficiency is increased. Additionally, greater volumetric efficiency may lead to increased torque. Furthermore, lowered combustion temperature with water injection may reduce NOx emissions, while a more efficient fuel mixture (reduced enrichment) may reduce carbon monoxide and hydrocarbon emissions.

Water injection systems include a water reservoir which may be refilled manually as well as opportunistically via water generated on-board the vehicle. For example, water in the form of condensate may be retrieved from one or more components, such as an EGR cooler, an AC evaporator, an exhaust heat exchanger, a charge air cooler, a vehicle external surface, etc. However, based on the source of the water, the quality of water injected into the engine may vary, affecting engine performance as well as potentially clogging the injection system.

Various approaches have been developed to test the flow of the water injection system. For example, the tests may determine whether the flow valve solenoids are energized, if the injection system is clogged, etc. One example approach is shown by Payling et al. in U.S. Pat. No. 6,553,753. Therein, a flow rate is varied and a flow error is learned based on a difference between the flow provided and the flow demanded. Based on the learned flow error, a shut-off valve of a water injection system is activated.

However, the inventors herein have identified potential issues with such an approach. As one example, the flow error may vary with engine conditions where water injection is applied. For example, during part throttle injection, small flow errors may not reflect clogging of the water injection system, however, the same magnitude of error during knock-limited engine operating conditions may reflect a higher degree of clogging. In addition, the smaller flow errors may have a larger impact on the engine performance at knock-limited engine operating conditions, or during catalyst cooling conditions. As another example, contaminants in the water may contribute to flow errors which may not be reliably differentiated from flow errors due to component issues. The nature of contaminants present in the water, as well as the degree of contamination, may vary widely based on where the vehicle operator refilled the water tank from. For example, it may be recommended to refill the water tank with distilled water, but the operator may refill with tap water or well water instead. This variation can result in minerals getting deposited on water filters, water injectors, engine parts, exhaust catalysts, etc. As yet another example, reliance on a single test to determine if the water injection system is functioning may be error prone due to the need to reliably detect relatively small changes in sensor data. Thus, a more robust functional test may be desired.

In one example, some of the above issues may be at least partly addressed by a method for an engine in a vehicle, comprising: predicting an expected injection error for a water injection system delivering water to the engine based on a quality of water in a water reservoir; if possible, estimating an actual injection error based on a change in engine parameters while ramping a water injection, and adjusting water injection to the engine based on either the actual error (if available), or based on the expected injection error. In this way, a water injection system on-board the vehicle may be reliably self-tested and the amount of water injected can be accurately controlled even with partial clogging.

As an example, a water tank of a vehicle may be refilled with water received from a remote location and/or with water collected during vehicle engine operation. The water may be injected during engine operation to leverage the charge cooling properties of water. Following refilling of the water tank, a quality (e.g., purity or usability) of the water may be assessed based on one or more properties of the water, such as conductivity, turbidity, particle matter content, etc. Based on the estimated water quality and the amount of time that the system is exposed to this water, a likelihood of clogging in a system delivering the water from the tank to the engine may be predicted. As such, clogging may result in a water injection error. Thus, an expected water injection error associated with the predicted likelihood of clogging may be determined and used as an initial estimate until the actual clogging level or injection error can be determined. When conditions allow a self-test, an actual injection error may then be determined based on a change in a set of engine operating parameters while a water injection is ramped in. The set of engine operating parameters may be selected based on the engine operating conditions at the time of the ramping in of a water injection. For example, the actual injection error may be learned based on a change in spark retard required to address knock when the ramping in is performed at high engine speed-high load conditions. Based on the actual error relative to the predicted error, a subsequent water injection (e.g., a timing, amount, and location of injection) to the engine may be adjusted. For example, water injection may be feed-forward adjusted based on the predicted error and then feedback adjusted based on the actual error. Further, a water injection window may be selected that better tolerates the level and nature of impurities in the water.

In this way, the flow of a water injection system may be reliably self-tested. The technical effect of learning a water injection error based on distinct sets of engine operating parameters at distinct engine operating conditions is that even small changes in sensory data can be reliably measured, thereby reducing errors in test results. In addition, a more robust self-test is enabled with reduced need for dedicated sensors. By correlating a water quality with errors in water injection, the water quality may be reliably assessed. In addition, system damage from contaminated water is reduced and parasitic losses and financial costs of purifying the water are minimized. The technical effect of integrating the water injection system with a control system that protects against contaminated water usage is that continued refilling of a water reservoir with contaminated water is reduced, extending engine component life. By improving water usage, the benefits of water injection can be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for improving the diagnosis of a water injection system coupled to a vehicle engine, as described with reference to the vehicle system of FIG. 1. A controller may be configured to perform a control routine, such as the example routine of FIG. 2, to self-test a degree of clogging in a water line coupling a water reservoir to the engine following refilling of the reservoir from an external source or on-board the vehicle. As elaborated at FIG. 3, the clogging may be learned based on deviation of an actual water injection error from an expected water injection error, the actual error estimated based on a change in a defined set of engine operating parameters while water injection is ramped. An example self-test and corresponding water injection adjustments are described with reference to FIG. 4. In this way, an engine water injection system can be reliably diagnosed and addressed to enable significant fuel economy improvements to the vehicle's performance.

Figure 1:
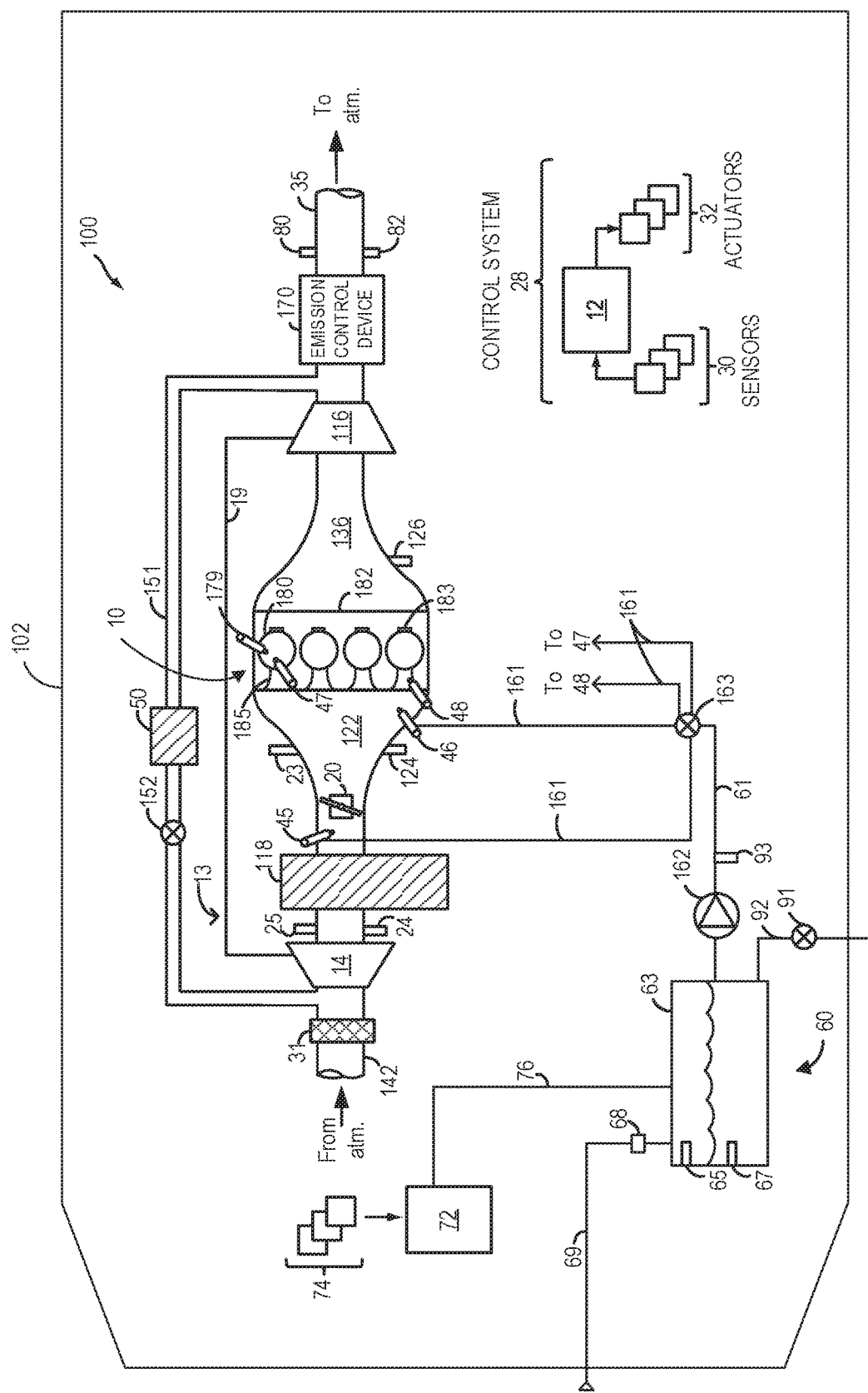
FIG. 1 shows a schematic diagram of an engine system including a water injection system.

FIG. 1 shows an example embodiment of an engine system 100 configured with a water injection system 60. Engine system 100 is coupled in motor vehicle 102, illustrated schematically. Engine system 100 includes an engine 10, depicted herein as a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 118 to throttle valve (e.g., intake throttle) 20. The CAC may be an air-to-air or air-to-coolant heat exchanger, for example. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 1, the pressure of the air charge within the intake manifold is sensed by manifold absolute pressure (MAP) sensor 124 and a boost pressure is sensed by boost pressure sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 122 is coupled to a series of combustion chambers or cylinders 180 through a series of intake valves (not shown) and intake runners (e.g., intake ports) 185. As shown in FIG. 1, the intake manifold 122 is arranged upstream of all combustion chambers 180 of engine 10. Additional sensors, such as manifold charge temperature (MCT) sensor 23 and air charge temperature sensor (ACT) 25 may be included to determine the temperature of intake air at the respective locations in the intake passage. The air temperature may be further used in conjunction with an engine coolant temperature to compute the amount of fuel that is delivered to the engine, for example. Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 23 may be positioned to determine the manifold charge temperature, and may include air and exhaust recirculated through the EGR passage 151.

Combustion chamber 180 also receives water and/or water vapor via water injection system 60. Water from water injection system 60 may be injected into the engine intake or directly into the combustion chambers 180 by one or more of water injectors 45-48. As one example, water may be injected into intake manifold 122, upstream of throttle 20, via water injector 45, herein also referred to as central water injection. As another example, water may be injected into intake manifold 122, downstream of the throttle in one or more locations, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection). In one embodiment, injector 48 arranged in the intake runners may be angled toward and facing the intake valve of the cylinder which the intake runner is attached to. As a result, injector 48 may inject water directly onto the intake valve, resulting in faster evaporation of the injected water and a higher dilution benefit from the water vapor. In another embodiment, injector 48 may be angled away from the intake valve and arranged to inject water against the intake air flow direction through the intake runner. As a result, more of the injected water may be entrained into the air stream, thereby increasing the charge cooling benefit of the water injection.

Though only one representative injector 47 and injector 48 are shown in FIG. 1, each of combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber).

Water injection system 60 may include a water storage tank 63, a water lift pump 162, a collection system 72, and a water filling passage 69. Water stored in water storage tank 63 is delivered to water injectors 45-48 via water passage 61 and conduits or lines 161. In embodiments that include multiple injectors, water passage 61 may contain a valve 163 (e.g., diverter valve, multi-way valve, proportioning valve, etc.) to direct water to the different water injectors via the corresponding conduits. Alternatively, each conduit (or water line) 161 may include respective valves within the water injectors 45-48, for adjusting water flow therethrough. In addition to water lift pump 162, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in water storage tank 63 is frozen or available for injection. In some embodiments, an engine coolant passage (not shown) may be thermally coupled with water storage tank 63 to thaw frozen water. The level of water stored in water storage tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water storage tank 63 is higher than a threshold level, it may be inferred that there is sufficient water available for injection, and accordingly water injection may be enabled by the controller. Else, if the level of water in the water storage tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system and/or exhaust system to collect water condensed from exhaust passing through the system. In another example, collection system 72 may be coupled with an air conditioning system (not shown) for collected water condensed from air passing through an evaporator. In yet another example, collection system 72 may be coupled with an external vehicle surface to collect rain or atmospheric condensation. Manual filling passage 69 may be fluidically coupled to a filter 68, which may remove some impurities contained in the water. A drain 92 including a drain valve 91 may be used to drain water from the water storage tank 63 to a location outside the vehicle (e.g., onto the road), such as when a quality of the water is deemed to be lower than a threshold and not suitable for injection into the engine (e.g., due to high conductivity, high particulate matter content). In one example, the quality of the water may be assessed based on the output of conductivity sensor 93 coupled to water injection system 60, in water line 61. In other examples, sensor 93 may be a capacitance sensor, optical sensor, turbidity sensor, density sensor, or some other type of water quality sensor. As elaborated with reference to FIGS. 2-3, a diagnostic test may be intermittently performed on the water injection system to reliably self-test the system and identify clogging in one of the water injection lines 161. Based on the detection of clogging, future water injection may be adjusted.

FIG. 1 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIG. 1, to receive input including transmission gear position, accelerator pedal position, brake demand, vehicle speed, engine speed, mass airflow through the engine, boost pressure, ambient conditions (temperature, pressure, humidity), etc. Other sensors include CAC 118 sensors, such as CAC inlet air temperature, ACT sensor 125, exhaust pressure and temperature sensors 80, 82, and pressure sensor 124, CAC outlet air temperature sensor, and MCT sensor 23, knock sensor 183 for determining ignition of end gases and/or water distribution among cylinders, and others. The controller 12 receives signals from the various sensors of FIG. 1 and employs the various actuators 32 of FIG. 1 to adjust engine operation based on the received signals and instructions stored on a memory of the controller. For example, injecting water to the engine may include adjusting a pulse-width of injectors 45-48 to vary an amount of water injected while also adjusting a timing of the water injection and a number of injection pulses. In some examples, the storage medium may be programmed with computer readable data representing instructions executable by the processor for performing the methods described below (e.g., at FIG. 3) as well as other variants that are anticipated but not specifically listed.

In this way, the system of FIG. 1 enables a vehicle system comprising an engine; a water injection system including a water reservoir, a water injector, and a water collection system; a transmission coupling the engine to vehicle wheels having a plurality of variable speed ratios; a water quality sensor coupled to the water reservoir; a mass air flow (MAF) sensor; a knock sensor; and a controller. The controller may be configured with computer readable instructions stored on non-transitory memory for: ramping water injection from a lower limit to an upper limit; when the engine is in a first speed-load region during the ramping, learning a first injection error as a percent of water injection based on an actual change in knock sensor output relative to an expected change in knock sensor output; when the engine is in a second speed-load region during the ramping, learning a second injection error as a percent of water injection based on an actual change in spark timing relative to an expected change in spark timing; when the engine is in a third speed-load region during the ramping, learning a third injection error as a percent of water injection based on an actual change in MAF relative to an expected change in MAF; estimating an average injection error based on at least two of the first, second, and third error; and indicating degradation of the water injection system based on the average injection error. The controller may optionally include further instructions for: when a water level in the reservoir is higher than a threshold level, estimating a quality of the water based on a refilling location and/or an output of the water quality sensor (e.g., a conductivity sensor, a turbidity sensor, etc); and predicting an expected injection error for the water injection system based on the estimated quality of the water. Further, the controller may include further instructions for: when the estimated quality of the water is lower than a first threshold, increasing usage of the water in an engine operating window defined by each of a degree of water contamination and a nature of contaminants present in the water; and when the estimated quality of the water is lower than a second threshold, lower than the first threshold, draining the water from the reservoir. Indicating degradation may include indicating clogging of a water line of the water injection system, a degree of clogging based on the average injection error relative to the expected injection error. The controller may then inject water from the water injector responsive to an indicating of knock, a pulse width of the water injection adjusted based on the average injection error.

Figure 2:
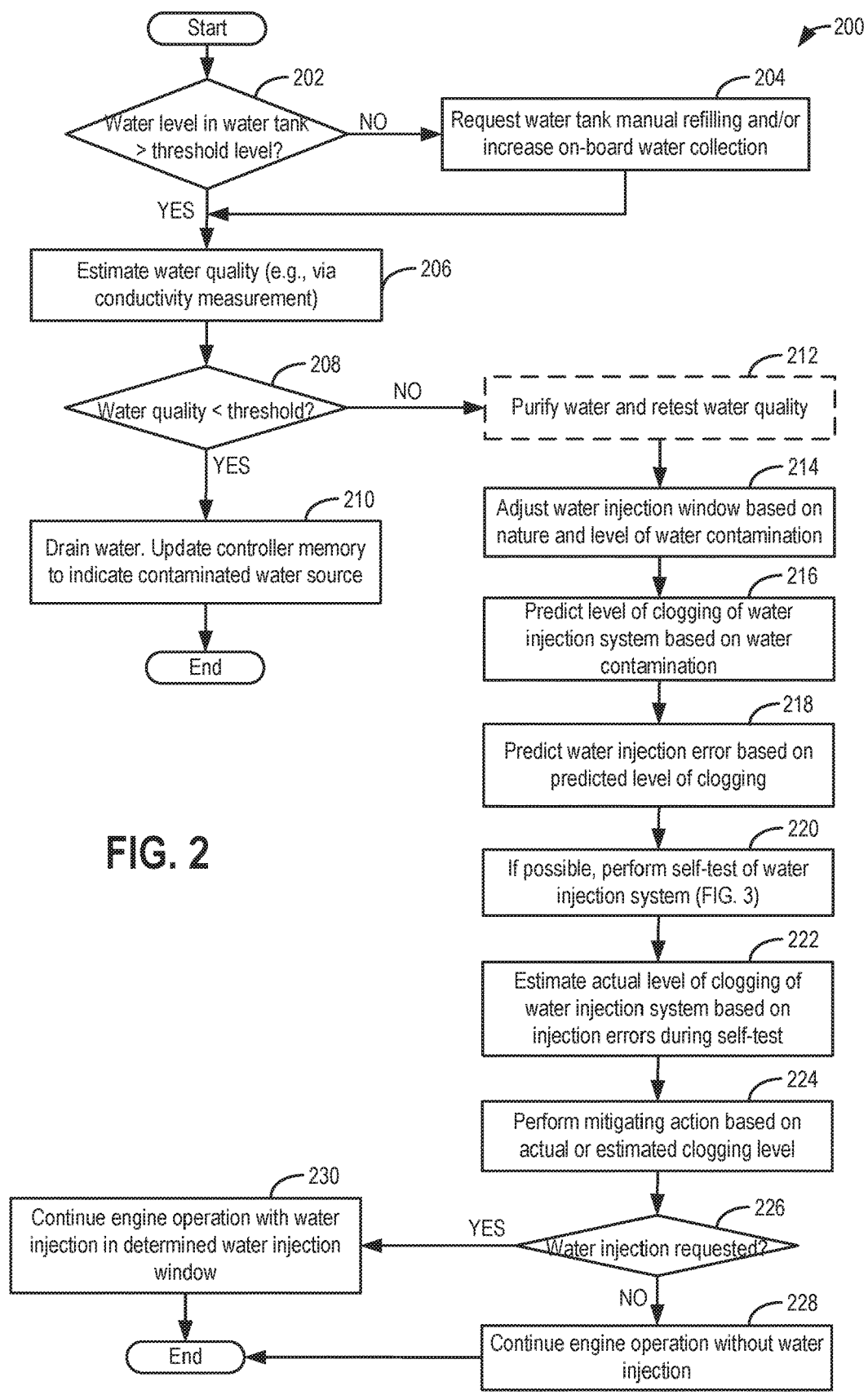
FIG. 2 shows a high level flow chart for reliably self-testing the water injection system of FIG. 1.

Turning now to FIG. 2, an example routine 200 is shown for reliably performing a self-test of the lines of a water injection system coupled in a vehicle. The method enables clogs in the water system to be identified faster and more accurately, and therefore mitigated in a timely fashion. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes determining if the water level in a water tank or reservoir of an engine water injection system is higher than a threshold level, such as above 10% of capacity. If not, then at 204, the method includes requesting a manual refilling of the water tank and/or increasing water collection on-board the vehicle. The water injection system may be coupled to an engine of a vehicle, and the water in the reservoir may be refilled manually from a water source off-board the vehicle, such as from a tap. Additionally or alternatively, the reservoir may be refilled on-board the vehicle via a collection system collecting condensate from one or more components, such as an EGR cooler, a charge air cooler, an AC evaporator, an exhaust heat exchanger, and a vehicle external surface. As elaborated with reference to the system of FIG. 1, the water reservoir may be refilled with condensate collected from, as non-limiting examples, water condensed from exhaust passing through an EGR system, and water condensed from air passing through an evaporator of a vehicle air conditioning system. Once the threshold refill level is reached in the water tank, the routine moves to 206.

At 206, the method includes estimating the quality of the water in the water reservoir. As such, the nature of contaminants present in the water, as well as the degree of contamination may vary widely based on where the vehicle operator refilled the water tank from. As an example, it may be recommended to refill the water tank with distilled water, but the operator may refill with tap water or well water instead. As such the different sources of water may contain different types and amounts of minerals and other contaminants that may cause deposits on water filters, water injectors, engine components, exhaust catalysts, etc. The catalysts may also become chemically contaminated. In one example, the quality of the water in the water tank may be estimated based on the output of a water quality sensor coupled to the water reservoir, the water quality estimate based on a conductivity value or ionic strength of the water (such as sensed via a conductivity sensor). In alternate examples, the quality of the water may be estimated based on an ionic strength of the water, a particle matter content, a turbidity sensor, a density sensor, a refraction index, etc.

In still other examples, the water quality may be inferred based on the water refilling location using knowledge of the vehicle's location (such as based on GPS data, location of nearby WiFi hotspots, etc.) combined with knowledge of the local water quality at that location (such as determined on-board or retrieved from a database, such as an internet database of water quality for city water systems and ground water). If the water quality value was inferred or retrieved from a remote location, the controller may additionally refine the data with previous history of contamination detected after refilling at the same location (as elaborated below). The history may be based on data collected on-board the given vehicle, or collected on-board an alternate vehicle and retrieved through vehicle-to-vehicle (V2V) or vehicle-to-infrastructure communication. In one example, the quality of the water may be given an index value, or a rating number. At 208, the estimated water quality (e.g., the index value or rating number or conductivity value) is compared to a threshold which depends on the water quality sensor being used. For example, a lower reading on a turbidity sensor may be given a high water quality index value, and turbidity readings of less than 5 NTU may correspond to water quality index values higher than the threshold. The threshold may correspond to a minimum water quality level required to enable water injection into the engine without compromising engine performance or combustion characteristics. In some examples, the estimated water quality may be compared to each of a lower threshold below which water injection may always be disabled, and an upper threshold above which water injection may always be enabled. In between the upper and lower threshold, water injection may be limited, for example, an operating window where water injection is permissible may be limited or varied.

If the estimated quality of the water is less than the threshold, then at 210, the method includes draining the water from the water reservoir, such as by opening a solenoid controlled drain valve coupling the water reservoir to a drain pipe that releases the water to a location outside the vehicle. The water may be fully or partially drained, the selection based on the level of contamination of the water and/or based on predictions of future water refills, water consumption rates, and water condensate collection rates. In one example, if draining of the water added to the reservoir is selected, the controller may close the vehicle refill tank cap or close a valve coupled in front of a tank inlet, while diverting the incoming water to a drain.

In addition, if the water was refilled at a location off-board the vehicle, a memory of the controller may be updated, with GPS coordinate information of the location, to indicate that the source of the water was contaminated. Further, the controller may limit access to a refill port/cap of the water tank based on the indication of water contamination. As a result, future water reservoir manual refills from that location may be limited, or at least temporarily disabled. In one example, an access door to the water tank refill port may be configured with a locking mechanism that is opened through a user interface, in a vehicle cabin space, in communication with the controller. The controller may issue location-based indications (e.g., warning beeps, or lights or messages displayed on a vehicle display on a center-console) when the local tap water or well water contamination level exceeds the threshold level based on a predicted risk of contamination. The controller may ask the vehicle operator to confirm that they are refilling with the appropriate water (e.g., distilled water) by pressing a button or saying "yes" before allowing the water tank refill door to open.

In still further examples, if the quality of the water is less than the threshold, instead of draining the water, the controller may increase usage of the water in order to "use up" the water to accommodate cleaner water from condensate collection or a cleaner subsequent refill. In this way, a time to a subsequent water tank refilling event is reduced (with the assumption that the water quality at the next refill event, at a different location, will have a higher quality). As an example, water injection may be enabled below a lower threshold temperature or above a higher threshold temperature, even when engine speed/load/power conditions do not need water injection for improved engine efficiency and performance, due to the different effect of temperature (of each engine component) on deposit formation at different engine components/locations. In one example, the temperature of each engine component or water injection system component (or at least only the critical ones) may be measured and compared, and then a minimum of the dataset may be selected. In another example, the temperature of each relevant engine component may be inferred based on one or more engine operating conditions including spark timing, exhaust air-fuel ratio, ambient temperature, vehicle speed, smart phone usage, etc.). At the same time, water injection is reduced in (or eliminated from) a window where deposits are likely.

If the water quality is above the threshold, at 212, optionally, the method includes purifying the water before water injection is retested. Purifying the water may include one or more of filtration (including filtering the water to remove particulate content), distillation, reverse osmosis, and ion-exchange. Distillation on-board the vehicle can generate a purified water stream using waste heat from the engine and/or the exhaust. Reverse osmosis may be one of a variety of membrane-based methods selected. Ion exchange may be used with a fixed bed that can either swap between different dissolved materials such as calcium and magnesium exchanged for sodium, or that can exchange the mentioned ions for ions that comprise water ($H^+$ and $OH^-$).

In some examples, a degree of purification, as well as a type of purification may be selected following the refill with contaminated water. In particular, sufficient purification may be provided to reduce the deposit issues, while avoiding excessive purification which would increase the parasitic losses (e.g., energy required to evaporate water for distillation or pump water through a filter) and financial costs (e.g., cost of replacement filters or ion exchange bed), and what would decrease customer satisfaction (due to the added hassle and cost of system service). A degree of purification may be selected as a function of the amount/proportion of water that is bypassed around the purification system to the engine, or as a function of how much time the water spends in the purification system. For example, as the amount of water that is bypassed increases, or as the amount of time spent in the purification system increases, the degree of purification may be correspondingly increased.

Next, at 214, the routine includes adjusting the water injection window based on the nature and level of water contamination. It may be known that certain types of contamination lead to deposit problems when certain components are within a certain temperature range. Therefore, when this type of contamination is detected a component temperature range where water injection is enabled may be adjusted to be below a lower threshold temperature and above a higher threshold temperature. As another example, if the water quality exceeds the threshold by a smaller amount, water injection may be performed in a wider range of operating conditions outside an ideal operating range selected for higher quality water. As another example, if the water quality deviates from the threshold by a larger amount, water injection may be performed in a still narrower range of operating conditions outside the ideal operating range selected for higher quality water.

At 216, the method includes predicting an expected level of clogging of a water line of the water injection system based on the estimated degree and nature of contamination. For example, as the estimated degree of contamination increases, the expected level of clogging of the water line may be correspondingly increased. The expected level of clogging of the water line may be further determined based on an expected temperature of one or more engine components at a time of the water injection.

At 218, the method includes predicting an expected water injection error for the predicted level of clogging of the water injection system. As the predicted level of clogging increases, an amount of error in the water injection amount may correspondingly increase. In addition, a location of the water injection error in the water injection system (e.g., at which component) may be determined.

At 220, the method includes performing a self-test of the water injection system to determine an actual water injection error, if possible. The actual level of water line clogging may be related via a function to the actual water injection error. As elaborated with reference to the routine of FIG. 3, estimating the actual water injection error may include ramping the water injection during each of a plurality of distinct engine operating conditions, and learning a water injection error based on a change in a set of engine operating parameters at each of the distinct conditions. Further, the set of engine operating parameters may be distinct (e.g., non-overlapping or only partially overlapping) for each of the distinct conditions. For example, during a first condition, water injection may be ramped and a first water injection error may be learned based on a change in a first set of engine operating parameters, during a second condition, water injection may be ramped and a second water injection error may be learned based on a change in a second set of engine operating parameters, and during a third condition, water injection may be ramped and a third water injection error may be learned based on a change in a third set of engine operating parameters, and so on. The actual water injection error may then be learned as a function of each of the first, second, and third water injection errors estimated during the self-test. For example, the actual water injection error may be learned as a function of an average of the first, second, and third water injection errors. In another example, the first, second, and third water injection errors may be compared, and only the two which agree most closely may be averaged to estimate actual water injection error. Learning the water injection error may include learning a percent water deficiency as elaborated with reference to FIG. 3.

As such, if the self test is not possible, such as due to self test conditions not being met, then the controller may proceed with adjusting a water injection amount based on the predicted water clogging level and the associated expected water injection error. For example, the expected water injection error may include an expected percent water deficiency and the water injection amount may be adjusted to compensate for the deficiency. In one example, if the expected percent water deficiency based on the predicted water clogging level is 30%, then the water injection amount (which is determined based on engine operating conditions) may be increased by 30% at the time of delivery.

If the self test is possible, and is successfully conducted, then at 222, the method includes estimating the actual level of clogging of the water injection system based on the actual water injection error learned during the self test. For example, the actual level of clogging may be determined as a function of the absolute level of the actual water injection error, or as a function of the actual water injection error relative to the expected water injection error.

At 224, the method includes performing a mitigating action based on the actual clogging level. For example, subsequent water injection to the engine may be adjusted based on both the actual error and the expected error. The water injection may be adjusted by adjusting a commanded water injection amount with a correction factor based on the degree of clogging. For example, an injection pulse width of a water injector may be adjusted during the injecting of water from the water reservoir into the engine responsive to knock. In one example, if the % water deficiency is determined to be 30%, then during a subsequent water injection event, where 50% water flow is required (e.g., to address knock), the commanded water injection may include 50%+30%=80% water flow. In another example, it may be possible to unclog parts of the system by using higher pressure or flowrate than otherwise needed, or by pulsing the pressure or flowrate, or by reversing flow in parts of the system.

Additionally, based on the determined level of clogging, a diagnostic code, such as a self-test code may be set, and the vehicle operator may be notified of the clogging, such as by activating a lamp or message on the vehicle dashboard.

At 226, the method includes determining if water injection is requested. If water injection is not requested, engine operation may be continued without water injection at 228. Else, if water injection is requested, at 230, engine operation may be continued with water injection in a water injection window selected based on engine speed-load conditions and engine knock constraints. For example, water injection may be continued in a high engine speed-load condition with the water injection amount adjusted with the clogging level-based correction factor.

In addition, a water injection amount may be adjusted based on at least one of the actual and predicted water injection error. Specifically, a water injection amount may be commanded with a correction factor based on either the actual or the predicted clogging level. Further, the water injection amount may be commanded with a correction factor based on each of the actual and the predicted clogging level (e.g., based on a comparison of the actual clogging level relative to the predicted clogging level). For example, if the self test is not completed, the water injection amount may be adjusted based on the predicted clogging level and associated expected water injection error. Else, if the self test if completed, the water injection amount may be adjusted based on the actual clogging level and associated actual water injection error. The controller may feed-forward estimate a degree of clogging based on the quality of water in the water injection system (or predicted injection error); feedback adjust the feed-forward estimated degree of clogging based on the actual injection error; and then inject water into the engine as a function of a commanded water injection amount and the feedback adjusted degree of clogging. The commanded water injection amount may be a base value retrieved from a look-up table in the controller's memory as a function of at least engine speed and load. In this way, a degree of clogging of the water injection system is determined based on a best available estimate of injection error, and water injection is accordingly compensated.

In this way, water line clogging may be reliably diagnosed addressed in a timely manner.

Figure 3:
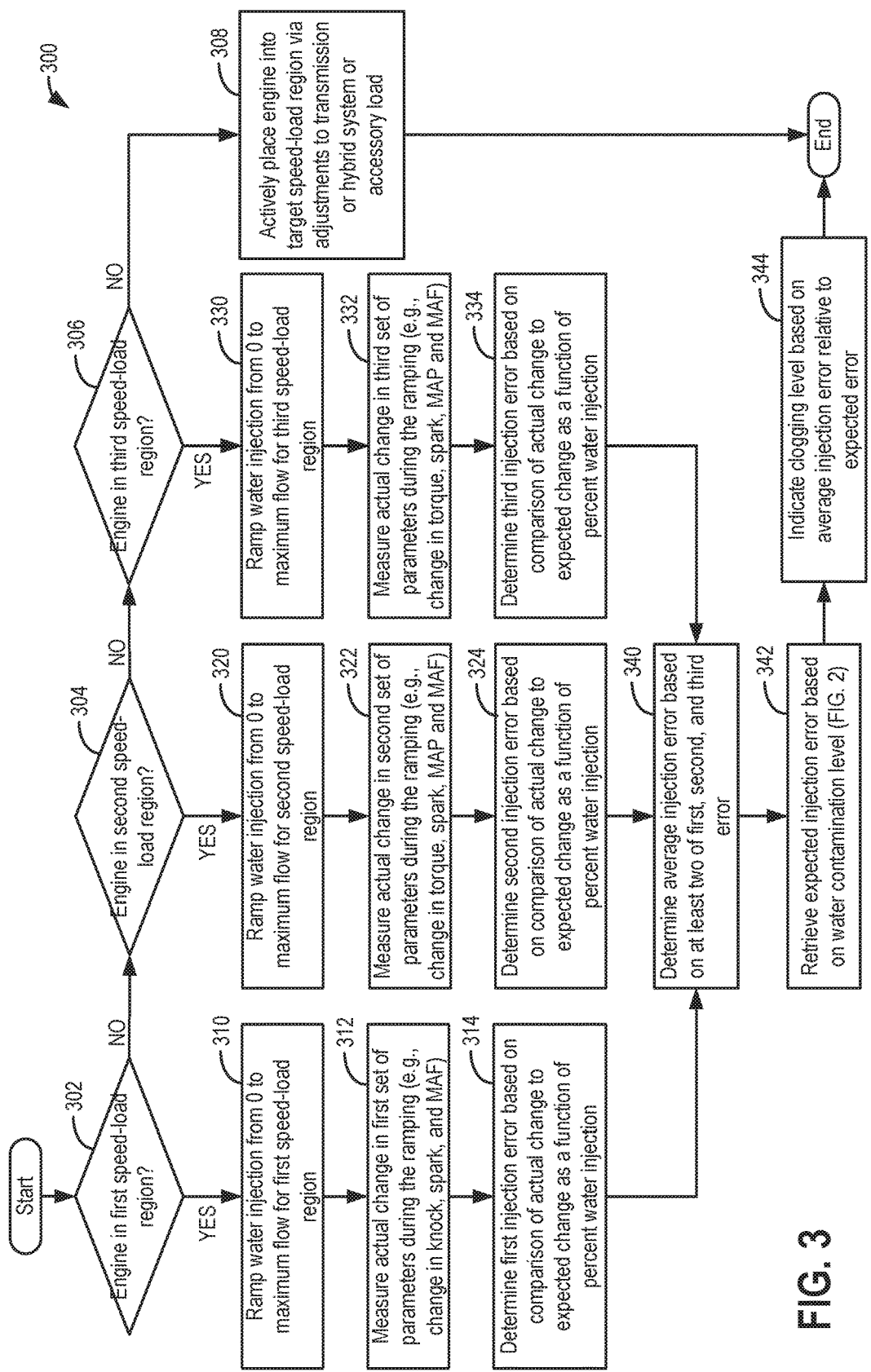
FIG. 3 shows a high level flow chart for learning a water injection error while ramping water injection into an engine.

Turning now to FIG. 3, an example method 300 is shown for self-testing the water injection system of FIG. 1. The method enables an actual water injection error to be reliably determined as a function of water injection errors learned based on distinct engine operating parameters at distinct engine operating conditions. The method of FIG. 3 may be performed as part of the routine of FIG. 2, such as at 220.

At 302, the method includes confirming that the engine is in a first speed-load region, for example, in a speed-load region where the engine is knock limited. In one example, the first speed-load region includes the engine being in a high load region while the engine speed is below a threshold speed. If the first engine speed-load region is confirmed, then at 310 the method includes ramping water injection into the engine. The water injection may be ramped from zero flow to full flow or to the maximum flow which is feasible while operating the engine in the first engine speed-load region. Alternatively, the water injection may be ramped from zero flow to a threshold flow required to enable the self-test to be reliably completed without wasting water. As used herein, injecting the water and ramping the water injection includes one or more of injecting the water directly into an engine cylinder via a direct water injection, injecting the water into an intake port, upstream of an intake valve via a port injector, and injecting the water into an engine intake manifold, upstream or downstream of an intake throttle, via a central fuel injector.

At 312, the method includes measuring a change in a first set of engine operating parameters during the ramping. The first set of parameters may include an engine knock level as a percent of water injection and an engine spark timing retard as a percent of the water injection. For example, as the water injection is ramped, knock and spark changes are measured and compared to expected knock and spark changes versus the percent of water injected. Then, the controller may determine a percent water deficiency based on the knock and spark changes. For example, it may be expected that under the current conditions MBT spark timing can be achieved without knock if the water injection amount is at least 20%. However, if knock continues to limit spark timing until 50% water injection is commanded, then the controller may infer that there is a 30% loss in the water flow. In still another example, the first of engine operating parameters may include a change in mass airflow (MAF) into the engine as a percent of the water injection, since higher water injection leads to cooler denser air and therefore higher MAF.

At 314, the method includes learning a first injection error for the first engine speed-load region based on the estimated change in the first set of parameters during the ramping including as a function of percent water injection.

Returning to 302, if the first speed-load region is not confirmed, the method moves to 304 to confirm if the engine is in a second speed-load region, for example, in a part-throttle speed-load region. In one example, the second speed-load region includes the engine operating at part-throttle conditions. This method is used because different engine parameters may be suitable for quantifying system clogging in different engine speed-load regions. If the second engine speed-load region is confirmed, then at 320 the method includes ramping water injection into the engine. The water injection may be ramped from zero flow to full flow or to the maximum flow which is feasible while operating the engine in the second engine speed-load region. Alternatively, the water injection may be ramped from zero flow to a threshold flow required to enable the self-test to be reliably completed without being combustion stability limited. As used herein, injecting the water and ramping the water injection includes one or more of direct, port, and central injecting the water into an engine cylinder.

At 322, the method includes measuring a change in a second set of engine operating parameters during the ramping. The second set of parameters may include an engine spark timing (e.g., change in a degree of spark retard applied) as a percent of the water injection, and mass air flow (MAF) as a percent of the water injection. The second set of parameters may further include a change in engine torque output versus spark timing because the water acts as a diluent that increases MBT spark timing. In other words, MBT spark will correspond to a higher spark value and torque will drop off past MBT. The controller may detect MBT of 100% water versus 0% water by the spark value where torque begins to drop. As one example, as the water injection is ramped, torque and spark changes are measured and compared to expected torque and spark changes versus the percent of water injected. Then, the controller may determine a percent water deficiency based on the torque and spark changes. Torque changes may be inferred based on change in vehicle acceleration, or based on input from a torque sensor. For example, the controller may calculate the percent water deficiency based on a difference of the actual spark change relative to the expected spark change for the given water injection percentage, as the water is ramped. As another example, during the ramping in of water injection, MAF may change because volumetric efficiency improves with water injection. The controller may compare actual MAF (or actual change in MAF) to expected MAF (or expected change in MAF) for the given throttle position (e.g., the degree of throttle opening at the part throttle position), cam timing, and/or air charge temperature (ACT). The percent water deficiency may then be calculated based on a difference of the actual MAF change relative to the expected MAF change for the given water injection percentage, as the water is ramped during the part throttle condition.

In still another example, the second of engine operating parameters may include a change in manifold absolute pressure (MAP) into the engine as a percent of the water injection. The change in MAP may also be due to the improvement in volumetric efficiency with water injection. The controller may compare actual change in MAP to an expected change in MAP for the given throttle position (e.g., the degree of throttle opening at the part throttle position), cam timing, and/or air charge temperature (ACT). The percent water deficiency may then be calculated based on a difference between the actual MAP change relative to the expected MAP change for the given water injection percentage, as the water is ramped during the part throttle condition.

At 324, the method includes learning a second injection error for the second engine speed-load region based on the estimated change in the second set of parameters during the ramping including as a function of percent water injection.

Returning to 304, if the second speed-load region is not confirmed, the method moves to 306 to confirm if the engine is in a third speed-load region, for example, in a high speed-high load region (wherein engine speed is above a threshold speed and engine load is above a threshold load. In one example, the third speed-load region includes the engine operating at high power conditions wherein water injection is enabled for catalyst cooling. The third speed-load region may be selected for engine operation with water injection if maximum power is requested. As another example, the third speed-load region may be selected for engine operation with water injection responsive to an exhaust catalyst temperature or an exhaust flange temperature being at or above a threshold temperature. The exhaust catalyst temperature or exhaust flange temperature may be a measured or modeled temperature.

If the third engine speed-load region is confirmed, then at 330 the method includes ramping water injection into the engine. The water injection may be ramped from zero flow to full flow or to the maximum flow which is feasible while operating the engine in the third engine speed-load region. Alternatively, the water injection may be ramped from zero flow to a threshold flow required to enable the self-test to be reliably completed without compromising torque delivery. As used herein, injecting the water and ramping the water injection includes one or more of direct, port, and central injecting the water into an engine cylinder.

At 332, the method includes measuring a change in a third set of engine operating parameters during the ramping. The third set of parameters may include a change in torque output, a change in exhaust catalyst temperature, and a change in manifold airflow as a percent of the water injection. For example, as the water injection is ramped, torque and MAF changes are measured and compared to expected torque and MAF changes versus the percent of water injected. Then, the controller may determine a percent water deficiency based on the torque and MAF changes. Torque changes may be inferred based on change in vehicle acceleration, or based on input from a torque sensor. In still another example, where the vehicle system is a hybrid vehicle system including a high voltage hybrid power-split motor, the controller may measure torque based on how the motor receives or reacts to the engine torque. For example, the engine torque may be determined based on the motor torque commanded to maintain the engine speed. The percent water deficiency may be calculated based on a difference between the actual MAF change relative to the expected MAF change for the given water injection percentage, as the water is ramped in. In still another example, the third set of engine operating parameters may include a change in manifold absolute pressure (MAP) into the engine as a percent of the water injection.

At 334, the method includes learning a third injection error for the third engine speed-load region based on the estimated change in the third set of parameters during the ramping including as a function of percent water injection.

From each of 314, 324, 334, the method moves to 340 wherein the method includes determining an average injection error based on at least two of the first, second, and third injection error. The at least two of the first, second, and third errors may be selected such that they have a smaller than threshold deviation in relative error values. In other words, the controller may select two of the three that agree the most with each other (e.g., are within 10% of each other). Then, an average of those two may be determined as the actual injection error.

At 342, the method includes retrieving an expected injection error based on the water contamination level. For example, as discussed with reference to FIG. 2, a water injection error may be predicted based on the amount and nature of contaminants in the water of the water tank. At 344, the method includes comparing the actual water injection error to the predicted water injection error to determine a degree of clogging of the water line. For example, the degree of clogging may be determined as a function of the difference between the actual injection error relative to the expected water injection error. In one example, the controller may feed-forward estimate a degree of clogging based on the expected water injector error and then feedback adjust the feed-forward estimated degree of clogging based on the actual injection error.

As elaborated at FIG. 2, the controller may then adjust water injection to the engine based on the determined degree of clogging. In particular, the water injection amount delivered to the engine may be determined as a function of a commanded water injection amount and the feedback adjusted degree of clogging. For example, an injection pulse width of a water injector may be adjusted during the injecting of water from the water reservoir into the engine responsive to knock. In one example, if the % water deficiency is determined to be 30%, then during a subsequent water injection event, where 50% water flow is required (e.g., to address knock), the commanded water injection may include 50%+30%=80% water flow. For example, the controller may determine a control signal to send to the water injector actuator, such as a pulse width of the signal being determined based on a determination of the clogging level. The controller may determine the pulse width through a determination that directly takes into account a determined clogging level or % water deficiency, such as increasing the pulse width with increasing clogging level or increasing percent water deficiency. The controller may alternatively determine the pulse width based on a calculation using a look-up table with the input being clogging level (or % water deficiency, or difference between actual water injection error and actual error) and the output being pulse-width. As another example, the controller may make a logical determination (e.g., regarding a position of an actuator of the water injector) based on logic rules that are a function of the clogging level. The controller may then generate a control signal that is sent to the water injector actuator.

If none of the first, second, or third speed-load regions are confirmed, then at 308, the method may include actively placing the engine into the target speed-load region by adjusting one of a transmission, a hybrid transaxle system, and an accessory coupled to the engine to hold the engine in a speed-load region corresponding to the first, second, or third condition. For example, the engine may be actively placed in the target speed-load region via powertrain adjustments to a step-ratio transmission (gear shift), or a continuously variable transmission (CVT) belt ratio, or a hybrid transaxle, or an engine accessory such as an alternator. In one example, the controller may shift gears or change CVT belt ratios to place the engine into the target speed-load region. In another example, the controller may actively and sequentially place the engine into the first, second, and third speed-load regions when the self-test conditions are met but the target engine speed-load condition is not met. In one example, wherein the vehicle is a hybrid electric vehicle, instead of waiting for high load conditions, high load conditions may be actively enforced by lowering the engine speed by selecting a gear ratio of a power-split drivetrain having an electronic CVT that provides the required engine speed. Alternatively, when the drivetrain includes a hybrid transaxle, an operating condition may be selected that increases engine power or torque or load by offsetting with battery power. As such, a wheel torque at the vehicle may remain unchanged when the adjustments are used. In this way, the required speed-load region may be provided without causing torque excursions.

In this way, a controller may estimate an actual level of clogging of the water injection system based on the average injection error, compare the actual level to a predicted level of clogging of the water line, the predicted level based on an estimated quality of water refilled into the water reservoir, and based on the actual level and/or based on the comparing, adjust an amount of water injected into the engine responsive to a subsequent indication of knock.

It will be appreciated that an expected water injection error associated with the predicted likelihood of clogging may be determined and used as an initial estimate until the actual clogging level or injection error can be determined. When conditions allow a self-test of the water injection system, an actual injection error may then be determined based on a change in a set of engine operating parameters while a water injection is ramped in.

Figure 4:
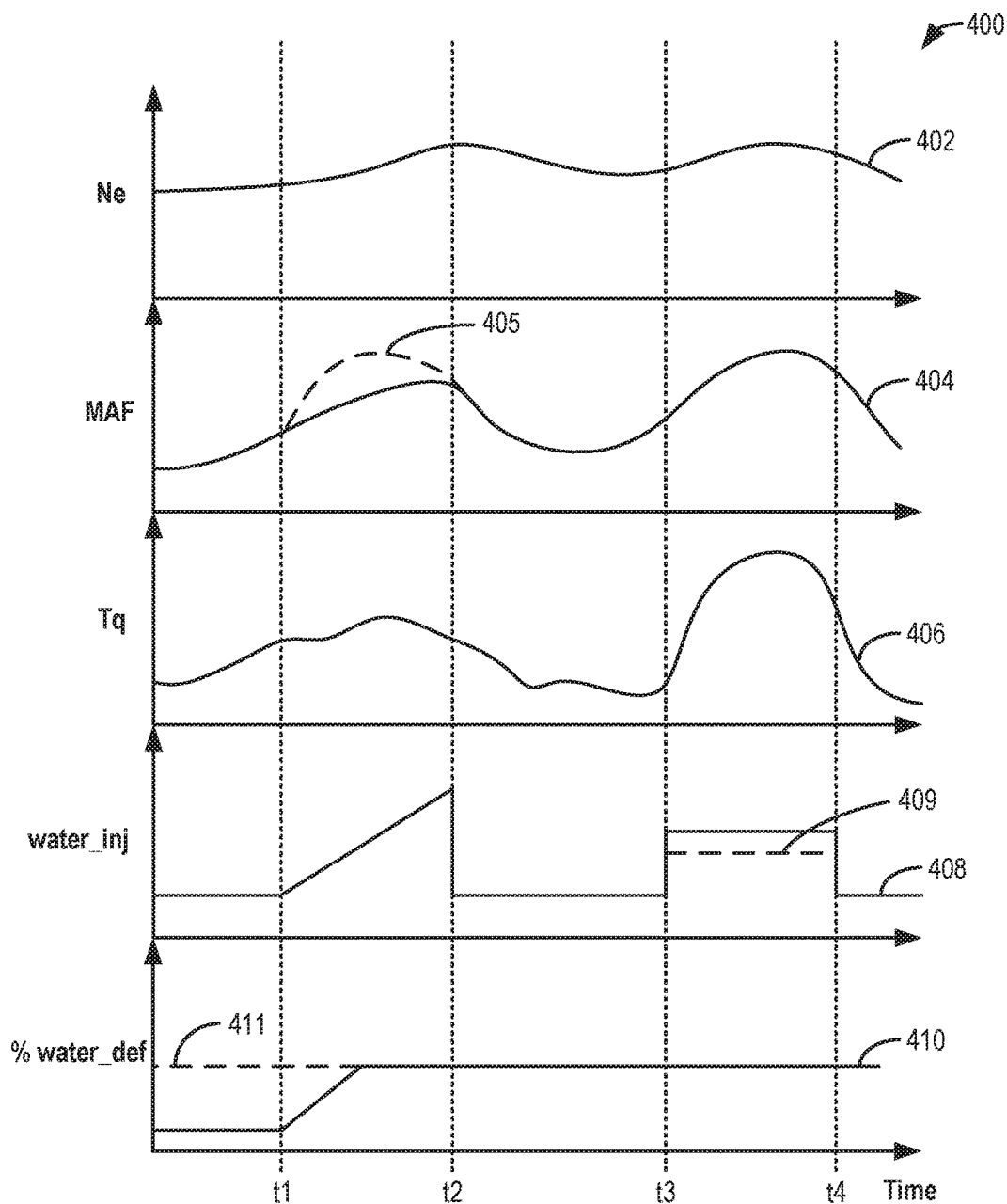
FIG. 4 shows an example water line self-test and adjustments to water usage based on the results of the self-test.

FIG. 4 shows a map 400 depicting an example self-test of a water injection system and adjustments to a knock mitigating water injection responsive to the indication of waterline clogging during the self-test. Map 400 depicts engine speed at plot 402, measured MAF at plot 404 (solid line), expected MAF at plot 405 (dashed line), engine torque output at plot 406, engine water injection at plot 408, and engine water deficiency at plot 410. All plots are depicted over time along the x-axis.

Prior to t1, the engine may be operating at low engine speeds, with no water injection. At t1, water injection system self-test conditions may be met and a self-test may be initiated. At t2, the self-test may be completed and the water injection ramping in may be terminated. Between t1 and t2, water injection is ramped to a maximum amount possible for the given operating conditions. Based on a difference between the measured MAF and the expected MAF in the interval t1-t2, a % water deficiency is determined. In the depicted example, a % water deficiency level of 411 is learned and saved in the controller's memory. In one example, based on the measured MAF relative to the expected MAF during the ramping in of water, a 30% water deficiency may be determined.

Between t2 and t3, the engine operates in speed-load regions where water injection is not required. At t3, responsive to an increase in driver torque demand and a corresponding increase in engine output torque, water injection is commanded. Between t3 and t4, water is injected into the engine taking into account the amount of water required for knock, dilution, and/or catalyst temperature control at the given operating conditions, and further based on the learned percent water deficiency. In particular, water injection is provided at level 408, higher than level 409 that would have been applied if the water deficiency was at 0%.

It will be appreciated that while the depicted example adjusts the water injection based on a measured clogging level and calculated water deficiency percent that is calculated based on the measured MAF error during the self-test, in alternate examples, when self-test conditions are not met or self-rest results are not available, the water injection may be adjusted based on an expected clogging level and expected water deficiency percent. For example, an engine controller may use the water quality estimate to predict the clogging level (e.g., degree of clogging over time) as a feed-forward estimate, and then use a determination of the actual clogging (feedback, based on the self-test, when available) to update the clogging level and water deficiency percent over time. The clogging estimate (including the feedback value plus the feedforward value) may then be used to adjust the water injection when water injection is commanded so that a more accurate amount of water injection can be provided.

In this way, a water injection system may be reliably self-diagnosed by diagnosing distinct sets of engine parameters in different engine speed-load regions while injecting water to the engine. As a result, sensor data can be reliably measured and the test results may have a higher confidence value. The technical effect of predicting water injection errors based on an estimated quality of water refilled in the water tank is that water injection system clogging can be better identified based on deviation of an actual error from the predicted error. By reducing engine damage from contaminated water, and by accurately controlling water injection even with partial clogging, engine operational costs are reduced. In addition, engine warranty issues are reduced. Overall, the use of water injection in an engine can be extended, providing fuel economy and engine performance benefits.

One example method for an engine comprises: predicting an expected injection error for a water injection system delivering water to the engine based on a quality of water in a water reservoir; estimating an actual injection error based on a change in engine parameters while ramping a water injection; and adjusting water injection to the engine based on either the expected error or the actual injection error. In the preceding example, additionally or optionally, the adjusting includes indicating a degree of clogging of the water injection system based on a best available estimate of injection error and adjusting a commanded water injection amount with a correction factor based on the degree of clogging. In any of the preceding examples, additionally or optionally, the adjusting includes feed-forward estimating a degree of clogging based on the quality of water; feedback adjusting the feed-forward estimated degree of clogging based on the actual injection error; and injecting water into the engine as a function of a commanded water injection amount and the feedback adjusted degree of clogging. In any of the preceding examples, additionally or optionally, estimating an actual injection error includes: during a first condition, ramping water injection and learning a first water injection error based on the change in a first set of engine parameters, during a second condition, ramping water injection and learning a second water injection error based on the change in a second set of parameters; during a third condition, ramping water injection and learning a third water injection error based on the change in a third set of parameters; and estimating the actual injection error as an average of at least two of the first, second, and third errors. In any of the preceding examples, additionally or optionally, the at least two of the first, second, and third errors have a smaller than threshold deviation in relative error values. In any of the preceding examples, additionally or optionally, the method further comprises adjusting a one of a transmission or a hybrid system or an accessory coupled to the engine to hold the engine in a speed-load region corresponding to the first, second, or third condition. In any of the preceding examples, additionally or optionally, the first condition includes engine load higher than a threshold load and engine speed lower than a threshold speed, and the first set of parameters includes a change in knock frequency, a change in spark timing, and a change in mass airflow; the second condition includes an intake throttle opening being lower than a threshold opening, and the second set of parameters includes a change in torque output, a change in spark timing, a change in mass airflow, and a change in manifold absolute pressure; and the third condition includes engine load higher than a threshold load and engine speed higher than a threshold speed, and the third set of parameters includes a change in torque output, a change in exhaust catalyst temperature, and a change in mass airflow. In any of the preceding examples, additionally or optionally, the engine is coupled in a vehicle, and wherein the water in the reservoir is refilled manually from a water source off-board the vehicle or refilled on-board the vehicle via a collection system, the collection system collecting condensate from one or more of an EGR cooler, a charge air cooler, an AC evaporator, an exhaust heat exchanger, and a vehicle external surface. In any of the preceding examples, additionally or optionally, the method further comprises: estimating the quality of the water in the water reservoir based on a refilling location and/or based on a water quality sensor; if the estimated quality is higher than a threshold, purifying the water before injecting the water; and if the estimated quality is lower than a threshold, draining the water from the water reservoir or increasing usage of the water in an engine operating window determined based on the estimated quality. In any of the preceding examples, additionally or optionally, the method further comprises, responsive to the estimated quality of water being lower than the threshold, wherein the water was refilled from a water source off-board the vehicle, indicating that the water source is contaminated and disabling future refilling of the water reservoir at the water source.

Another example method for an engine comprises: injecting water from a water reservoir into an engine responsive to knock; during a first condition, ramping water injection and learning a first water injection error based on a change in a first set of parameters during the ramping; during a second condition, ramping water injection and learning a second water injection error based on a change in a second set of parameters during the ramping; during a third condition, ramping water injection and learning a third water injection error based on a change in a third set of parameters during the ramping; determining an average injection error based on at least two of the first, second, and third errors; and indicating water injection system clogging based on the average injection error. In the preceding example, additionally or optionally, the method further comprises, in response to the indicating, adjusting an injection pulse width of a water injector during the injecting water from the water reservoir into the engine responsive to knock. In any of the preceding examples, additionally or optionally, the method further comprises: estimating an actual level of clogging of the water line based on the average injection error; comparing the actual level to a predicted level of clogging of the water line, the predicted level based on an estimated quality of water refilled into the water reservoir; and based on one or more of the actual level and predicted level of clogging, adjusting an amount of water injected into the engine responsive to a subsequent indication of knock. In any of the preceding examples, additionally or optionally, the first condition includes the engine being knock-limited, and the first set of parameters include an engine knock level as a percent of water injection and an engine spark timing retard as a percent of water injection, the second condition includes the engine operating at part-throttle, and the second set of parameters include the engine spark timing retard as a percent of water injection, and mass air flow as a percent of water injection, and the third condition includes the engine operating at high speed and high load, and the third set of parameters include change in torque output as a percent of water injection and mass air flow as a percent of water injection. In any of the preceding examples, additionally or optionally, the method further comprises adjusting a speed ratio of transmission or adjusting a hybrid system or adjusting accessories coupled to the engine to hold the engine in a first speed-load region during the first condition, in a second speed-load region during the second condition, and a third speed-load region during the third condition, wherein the first, second, and third speed-load regions are non-overlapping or partially overlapping. In any of the preceding examples, additionally or optionally, injecting the water includes one or more of injecting the water directly into an engine cylinder via a direct water injector, injecting the water into an intake port, upstream of an intake valve, via a port water injector, injecting the water into an engine intake manifold, upstream or downstream of an intake throttle, via a central water injector.

Another example vehicle system comprises: an engine; a water injection system including a water reservoir, a water injector, and a water collection system; a transmission coupling the engine to vehicle wheels; a water quality sensor coupled to the water reservoir; a mass air flow (MAF) sensor; a knock sensor; and a controller with computer readable instructions stored on non-transitory memory for: ramping water injection from a lower limit to an upper limit; when the engine is in a first speed-load region during the ramping, learning a first injection error as a percent of water injection based on an actual change in knock sensor output relative to an expected change in knock sensor output; when the engine is in a second speed-load region during the ramping, learning a second injection error as a percent of water injection based on an actual change in spark timing relative to an expected change in spark timing; when the engine is in a third speed-load region during the ramping, learning a third injection error as a percent of water injection based on an actual change in MAF relative to an expected change in MAF; estimating an average injection error based on at least two of the first, second, and third error; and indicating degradation of the water injection system based on the average injection error. In the preceding example, additionally or optionally, the controller includes further instructions for: when a water level in the reservoir is higher than a threshold level, estimating a quality of the water based on refilling location and/or based on an output of the water quality sensor; and predicting an expected injection error for the water injection system based on the estimated quality of the water. In any of the preceding examples, additionally or optionally, the controller includes further instructions for: when the estimated quality of the water is lower than a first threshold, increasing usage of the water in an engine operating window defined by each of a degree of water contamination and a nature of contaminants present in the water; and when the estimated quality of the water is lower than a second threshold, lower than the first threshold, draining the water from the reservoir. In any of the preceding examples, additionally or optionally, indicating degradation includes indicating clogging of the water injection system, a degree of clogging based on the average injection error relative to the expected injection error, and wherein the controller includes further instructions for: injecting water from the water injector responsive to an indicating of knock, a pulse width of the water injection adjusted based on the average injection error.

The invention claimed is:

1. A method for an engine, comprising:
predicting an expected injection error for a water injection system delivering water to the engine based on a quality of water in a water storage tank;
estimating an actual injection error based on a change in engine parameters while ramping a water injection; and
adjusting water injection to the engine based on either the expected injection error or the actual injection error.

2. The method of claim 1, wherein the adjusting includes indicating a degree of clogging of the water injection system based on a best available estimate of injection error and adjusting a commanded water injection amount with a correction factor based on the degree of clogging.

3. The method of claim 1, wherein the adjusting includes:
feed-forward estimating a degree of clogging based on the quality of water;
feedback adjusting the feed-forward estimated degree of clogging based on the actual injection error; and
injecting water into the engine as a function of a commanded water injection amount and the feedback adjusted degree of clogging.

4. The method of claim 1, wherein the estimating an actual injection error includes:
during a first condition, ramping water injection and learning a first water injection error based on the change in a first set of engine parameters;
during a second condition, ramping water injection and learning a second water injection error based on the change in a second set of engine parameters;
during a third condition, ramping water injection and learning a third water injection error based on the change in a third set of engine parameters; and
estimating the actual injection error as an average of at least two of the first, second, and third errors.

5. The method of claim 4, wherein the at least two of the first, second, and third errors have a smaller than threshold deviation in relative error values.

6. The method of claim 4, further comprising, adjusting one of a transmission and a hybrid system and an accessory coupled to the engine to hold the engine in a speed-load region corresponding to the first, the second, or the third condition.

7. The method of claim 4, wherein the first condition includes engine load higher than a threshold load and engine speed lower than a threshold speed, and the first set of engine parameters includes a change in knock frequency, a change in spark timing, and a change in mass airflow; wherein the second condition includes an intake throttle opening being lower than a threshold opening, and the second set of engine parameters includes a change in torque output, a change in spark timing, a change in mass airflow, and a change in manifold absolute pressure; and wherein the third condition includes engine load higher than a threshold load and engine speed higher than a threshold speed, and the third set of parameters includes a change in torque output, a change in exhaust catalyst temperature, and a change in mass airflow.

8. The method of claim 1, wherein the engine is coupled in a vehicle, and wherein water in the water storage tank is refilled manually from a water source off-board a vehicle or refilled on-board the vehicle via a collection system, the collection system collecting condensate from one or more of an EGR cooler, a charge air cooler, an AC evaporator, an exhaust heat exchanger, and a vehicle external surface.

9. The method of claim 8, further comprising:
estimating the quality of the water in the water storage tank based on refilling location and/or based on a water quality sensor,
if the estimated quality is higher than a threshold, purifying the water before injecting the water; and
if the estimated quality is lower than the threshold, draining the water from the water storage tank or increasing usage of the water in an engine operating window determined based on the estimated quality.

10. The method of claim 9, further comprising, responsive to the estimated quality of water being lower than the threshold, wherein the water was refilled from a water source off-board the vehicle, indicating that the water source is contaminated and disabling future refilling of the water storage tank at the water source.

11. A method for an engine, comprising:
injecting water from a water storage tank into the engine responsive to knock;
during a first condition, ramping water injection and learning a first water injection error based on a change in a first set of parameters during the ramping;
during a second condition, ramping water injection and learning a second water injection error based on a change in a second set of parameters during the ramping;
during a third condition, ramping water injection and learning a third water injection error based on a change in a third set of parameters during the ramping;
determining an average injection error based on at least two of the first, second, and third errors; and
indicating water injection system clogging based on the average injection error.

12. The method of claim 11, further comprising, in response to the indicating, adjusting an injection pulse width of a water injector during the injecting water from the water storage tank into the engine responsive to knock.

13. The method of claim 11, further comprising:
estimating an actual level of clogging of ! water injection system based on the average injection error;
comparing the actual level to a predicted level of clogging of the water injection system, the predicted level based on an estimated quality of water refilled into the water storage tank; and
based on one or more of the actual and predicted level of clogging, adjusting an amount of water injected into the engine responsive to a subsequent indication of knock.

14. The method of claim 11, wherein the first condition includes the engine being knock-limited, and the first set of parameters include an engine knock level as a percent of water injection and an engine spark timing retard as a percent of water injection, wherein the second condition includes the engine operating at part-throttle, and the second set of parameters include the engine spark timing retard as a percent of water injection, and mass air flow as a percent of water injection, and wherein the third condition includes the engine operating at high speed and high load, and the third set of parameters include change in torque output as a percent of water injection and mass air flow as a percent of water injection.

15. The method of claim 11, further comprising,
adjusting one of a transmission and a hybrid system and an accessory coupled to the engine to hold the engine in a first speed-load region during the first condition, in a second speed-load region during the second condition, and a third speed-load region during the third condition, wherein the first, second, and third speed-load regions are non-overlapping or partially overlapping.

16. The method of claim 11, wherein injecting water includes one or more of injecting the water directly into an engine cylinder via a direct water injector, injecting the water into an intake port, upstream of an intake valve, via a port water injector, injecting the water into an engine intake manifold, upstream or downstream of an intake throttle, via a central water injector.

17. A vehicle system, comprising:
an engine;
a water injection system including a water storage tank, a water injector, and a water collection system;

a transmission coupling the engine to vehicle wheels having a plurality of speed ratios;
a water quality sensor coupled to the water storage tank;
a mass air flow (MAF) sensor;
a knock sensor; and
a controller with computer readable instructions stored on non-transitory memory for:
  ramping water injection from a lower limit to an upper limit;
  when the engine is in a first speed-load region during the ramping, learning a first injection error as a percent of water injection based on an actual change in knock sensor output relative to an expected change in knock sensor output;
  when the engine is in a second speed-load region during the ramping, learning a second injection error as a percent of water injection based on an actual change in spark timing relative to an expected change in spark timing;
  when the engine is in a third speed-load region during the ramping, learning a third injection error as a percent of water injection based on an actual change in MAF relative to an expected change in MAF;
  estimating an average injection error based on at least two of the first, second, and third errors; and
  indicating degradation of the water injection system based on the average injection error.

18. The system of claim 17, wherein the controller includes further instructions for:
  when a water level in the water storage tank is higher than a threshold level, estimating a quality of water based on refilling location and/or based on an output of the water quality sensor; and
  predicting an expected injection error for the water injection system based on the estimated quality of the water.

19. The system of claim 18, wherein the controller includes further instructions for:
  when the estimated quality of the water is lower than a first threshold, increasing usage of the water in an engine operating window defined by each of a degree of water contamination and a nature of contaminants present in the water; and
  when the estimated quality of the water is lower than a second threshold, lower than the first threshold, draining the water from the water storage tank.

20. The system of claim 18, wherein indicating degradation includes indicating clogging of the water injection system, a degree of clogging based on the average injection error relative to the expected injection error, and wherein the controller includes further instructions for:
  injecting water from the water injector responsive to an indication of knock, a pulse width of the water injection adjusted based on the average injection error.

* * * * *